US010308794B2

(12) United States Patent
Steffl et al.

(10) Patent No.: US 10,308,794 B2
(45) Date of Patent: Jun. 4, 2019

(54) COPOLYMER COMPOSITION FOR SEMICONDUCTIVE CABLE LAYER

(75) Inventors: Thomas Steffl, Stenungsund (SE); Christer Svanberg, Kallered (SE); Katja Klimke, Linz (AT); David Friel, Copenhagen (DK)

(73) Assignee: Borealis AG, Vienna (AT)

(*) Notice: Subject to any disclaimer, the term of this patent is extended or adjusted under 35 U.S.C. 154(b) by 56 days.

(21) Appl. No.: 13/702,447

(22) PCT Filed: May 31, 2011

(86) PCT No.: PCT/EP2011/058936
§ 371 (c)(1),
(2), (4) Date: Feb. 19, 2013

(87) PCT Pub. No.: WO2011/154287
PCT Pub. Date: Dec. 15, 2011

(65) Prior Publication Data
US 2013/0161059 A1 Jun. 27, 2013

(30) Foreign Application Priority Data
Jun. 10, 2010 (EP) .................................... 10165493

(51) Int. Cl.
*C08L 51/00* (2006.01)
*C08L 23/10* (2006.01)
*H01B 9/02* (2006.01)
*C08F 255/02* (2006.01)
*C08L 23/08* (2006.01)
*C08L 23/16* (2006.01)
*C08L 51/06* (2006.01)
*C08K 3/013* (2018.01)

(52) U.S. Cl.
CPC ............ *C08L 23/10* (2013.01); *C08F 255/02* (2013.01); *C08L 23/0853* (2013.01); *C08L 23/0869* (2013.01); *H01B 9/027* (2013.01); *C08K 3/013* (2018.01); *C08K 2201/001* (2013.01); *C08L 23/08* (2013.01); *C08L 23/16* (2013.01); *C08L 51/06* (2013.01); *C08L 2205/02* (2013.01); *C08L 2207/02* (2013.01)

(58) Field of Classification Search
CPC ....................................................... H01B 1/24
USPC ......................................................... 252/511
See application file for complete search history.

(56) References Cited

U.S. PATENT DOCUMENTS

| 4,002,595 A | 1/1977 | Adelman |
| 4,038,042 A | 7/1977 | Adelman |
| 4,068,042 A | 1/1978 | Chillier-Duchatel |
| 4,169,816 A | 10/1979 | Tsien |
| 4,278,510 A | 7/1981 | Chien |
| 6,723,829 B1 * | 4/2004 | Malm ..................... C08F 10/00 528/481 |
| 7,723,434 B2 * | 5/2010 | Sugiura et al. ................ 525/79 |
| 8,487,185 B2 * | 7/2013 | Machl et al. ............. 174/110 R |
| 2002/0011347 A1 * | 1/2002 | Sato ......................... H01B 3/28 174/126.2 |
| 2004/0204530 A1 * | 10/2004 | Masuda ............... C08L 51/006 524/474 |
| 2013/0133922 A1 | 5/2013 | Steffl |

FOREIGN PATENT DOCUMENTS

| CN | 101397380 | 4/2009 |
| EP | 0129617 | 1/1985 |
| EP | 1008464 | 6/2000 |
| EP | 1630823 | 3/2006 |
| EP | 1916673 | 4/2008 |
| EP | 2128194 | 12/2009 |
| WO | 2009053042 | 4/2009 |
| WO | 2009056408 | 5/2009 |
| WO | 2011154287 | 12/2011 |

OTHER PUBLICATIONS

International Search Report for PCT/EP2011/058937 dated Jul. 11, 2011.
International Search Report for PCT/EP2011/058936 dated Jul. 4, 2011.
ASTM International, Document D1238-04, "Standard Test Method for Melt Flow Rates of Thermoplastics by Extrusion Plastometer," 2004, 13pp.
Bremner, T. et al., "Further Comments on the Relations between Melt Flow Index Values and Molecular Weight Distributions of Commercial Plastics," J. Appl. Polymer Sci., 1991, 43:1773.
Cambridge Polymer Group, "Correlating Melt Flow Index to Molecular Weight," 2017, <http://www.campoly.com/blog/correlating-melt-flow-index-molecular-weight/>, accessed Oct. 15, 2018, 7pp.
Cowie, J.M.G., "Polymers: Chemistry and Physics of Modern Materials," 2nd ed., 1991, Stanley Thornes (Publishers) Ltd. :Cheltenham, United Kingdom, Chapter 15.12 "Polyethylene," 4pp.
Hagstrom, B., "Prediction of melt flow rate (MFR) of bimodal polyethylene's based on MFR of their components," The Polymer Processing Society Extended Abstracts and Final Programme, Europe/Africa Region Meeting, Gothenburg, Sweden, Aug. 19-21, 1997, Conference of Polymer Processing, 3pp.

(Continued)

*Primary Examiner* — William D Young
(74) *Attorney, Agent, or Firm* — Gardner Groff Greenwald & Villanueva, PC

(57) ABSTRACT

Described herein are polymer compositions useful as a semiconductive layer suitable for cables. The polymer compositions include (a) a heterophasic copolymer of propylene, (b) a polar copolymer having a polar comonomer having polar groups, (c) a solid conductive filler, and optionally (d) a polyolefin functionalised with a mono- or polycarboxylic acid compound or a derivative of a mono- or polycarboxylic acid compound, wherein said compostion is not crosslinked by the addition of a crosslinking agent. Also described herein is a process for producing the polymer compositions as well as the use of the compositions thereof.

20 Claims, No Drawings

(56) References Cited

OTHER PUBLICATIONS

Langston, J.A., "Synthesis and Characterization of Long Chain Branched Isotactic Polypropylene via a Metallocene Catalyst and T-Reagent," Ph.D. Thesis, Pennsylvania State University, Dept. Materials Science and Engineering, 2007, 10pp (extract).

Polymer Properties Database, "Flow Properties of Polymers: Time-Independent Fluids," 2015, <https://polymerdatabase.com/polymer physics/Viscosity2.html>, accessed Oct. 15, 2018, 3pp.

Polymer Properties Database, "Branched Polymers," 2015, <https://polymerdatabase.com/polymer physics/BranchedPolymers.html>, accessed Oct. 15, 2018, 2pp.

Sepe, M. Plastics Technology, "Melt Flow Rate Testing—Part 3," 2013, <https://www.ptonline.com/columns/melt-flow-rate-testingpart-3>, accessed Oct. 15, 2018, 4pp.

Shenoy, A.V. et al., Rheologica Acta, "From melt flow index to rheogram," 1983, 22:90-101.

\* cited by examiner

COPOLYMER COMPOSITION FOR SEMICONDUCTIVE CABLE LAYER

IN THE CROSS-REFERENCE TO RELATED APPLICATIONS

This application is a U.S. national phase application under 35 USC 371 of international application number PCT/EP2011/058936, filed May 31, 2011, which claims priority to European Application No. 10165493.7, filed Jun. 10, 2010, which is hereby incorporated herein by reference in its entirety for all purposes.

FIELD OF INVENTION

The present invention relates to a composition for a semiconductive layer suitable for cables. Moreover, the present invention is related to a process for producing said composition as well as to a use of said composition. Further, the invention is also related to an article, preferably a cable, comprising said composition.

BACKGROUND

The idea to use polymer blends to reduce the amount of carbon black required to reach the percolation threshold is a well-established concept and is described in the following documents: EP0914367 which discloses a process for preparing an electronically-conductive thermoplastic composition having at least two phases, which includes (I) combining an amorphous or semi-crystalline thermoplastic polymer or miscible blend of polymers with an electronically-conductive carbon under conditions sufficient to disperse the conductive carbon, thereby forming a mixture having at least one phase, with at least 60 percent of the carbon dispersed in a first phase which comprises at least 90 percent by weight of the mixture; and (II) combining the mixture obtained from step (I) with an amorphous or semi-crystalline thermoplastic polymer or miscible blend of polymers, at least a portion of which is immiscible in the first phase, thereby forming a composition having at least two phases. U.S. Pat. No. 6,514,608 discloses a semiconductive jacket material for jacketing a cable comprising a minor phase material which is a semicrystalline polymer; a conductive filler material dispersed in the minor phase material in an amount sufficient to be equal to or greater than an amount required to generate a continuous conductive network in the minor phase material; and a major phase material which is a polymer which when mixed with the minor phase material will not engage in electrostatic interactions that promote miscibility. EP971366 discloses a conductive polymer composite material in the form of a (semi)conductive ternary composite having distinct co-continuous phases and comprises a minor phase material comprising a semicrystalline polymer; a conductive filler material dispersed in the minor phase material in an amount sufficient to generate a continuous conductive network in the minor phase material; and a major phase material being a polymer which when mixed with the minor phase material does not engage in electrostatic interactions that promote miscibility, the major phase material having the minor phase material dispersed therein in an amount sufficient to generate a continuous conductive network in the major phase material. EP971368 discloses a semiconductive material for use in jacketing cables in the form of a ternary composite having distinct co-continuous phases and comprises a minor phase material comprising a semicrystalline polymer; a conductive filler material dispersed in the minor phase material in an amount sufficient to generate a continuous conductive network in the minor phase material; and a major phase material being a polymer which when mixed with the minor phase material does not engage in electrostatic interactions that promote miscibility, the major phase material having the minor phase material dispersed therein in an amount sufficient to generate a continuous conductive network in the major phase material.

Additionally, in EP1619217 is disclosed an insulation layer for cables comprising a heterophasic polymer composition having superior mechanical and electrical properties and being environmentally friendly. The heterophasic polymer composition comprises a polymer matrix and dispersed therein a propylene copolymer having a weight average particle size of less than 1 μm.

In EP1847565 is disclosed an insulation layer for cables, a composition and a process thereof, showing improved stress whitening resistance by maintaining good mechanical and electrical properties and being environmental friendly.

However none of the above documents addresses the objective of providing a semiconductive polymer composition having desired combination balance between mechanical properties both at high and low temperature.

DESCRIPTION OF THE INVENTION

The present invention provides a polymer composition suitable for a semiconductive layer of a cable comprising
(a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);

and wherein the polymer composition has a Charpy Notch Impact Strength of at least 10 kJ/m$^2$ at −20° C. measured in accordance with ISO 179-1eA:2000 as described below under "Determination methods".

Unexpectedly the addition of a polar copolymer (b) to a polymer composition comprising propylene polymer (a) and a solid conductive filler (c) results in a polymer composition which has highly advantageous impact strength at high temperatures and, surprisingly, also at low temperatures expressed as Charpy Notch Impact Strength at 23° C. and at −20° C. determined as defined below under "Determination methods".

Moreover, the polymer composition has, in addition to excellent impact strength, even at low temperatures, also high flexibility expressed as Tensile strain at break (%) properties measured according to ISO 527-2 as described below under "Determination methods". Accordingly, the polymer composition of the invention has very desirable combination balance between impact strength and flexibility properties also at low temperatures.

It is evident that the propylene polymer (a), the polar copolymer (b) and the optional polyolefin functionalised with a mono- or polycarboxylic acid compound or a derivative of a mono- or polycarboxylic acid compound (d) are different polymers, i.e. they differ from each other.

"Polar copolymer" means herein generally a polymer wherein polar groups are incorporated to a polymer by grafting a compound bearing polar groups or by copolymerising a monomer with a comonomer(s) bearing a polar group(s). Polar group means a chemically functional group, as evident for a skilled person.

"Functionalised" means herein a chemical modification, preferably grafting or copolymerising with a mono- or polycarboxylic compound or a derivative of a mono- or polycarboxylic compound to provide the desired functional groups. The optional polyolefin functionalised with a mono- or polycarboxylic acid compound or a derivative of a mono- or polycarboxylic acid compound (d) is referred herein also shortly as "optional functionalised polyolefin (d)".

Both grafting and copolymerisation techniques are well known in the polymer field.

The present invention further provides a process for the manufacturing of the polymer composition of the invention, which comprises the steps of mixing, preferably in a mixer or an extruder, a propylene polymer (a), a polar copolymer (b), a solid conductive filler (c) and, optionally, a functionalised polyolefin (d). Preferably the mixed polymer composition is pelletised to pellets. The pellets are preferably provided for producing an article, preferably a cable.

The present invention further provides an article comprising the polymer composition of the invention. Said article is preferably a cable, comprising a conductor surrounded by at least one layer, wherein the layer comprises the polymer composition as defined above, below or in claims.

The preferred cable is selected from a cable comprising a conductor surrounded by at least a semiconductive layer comprising, preferably consisting of, the polymer composition which comprises
  (a) a propylene polymer,
  (b) a polar copolymer,
  (c) a solid conductive filler and, optionally,
  (d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);
  and wherein the polymer composition has a Charpy Notch Impact Strength of at least 10 kJ/m$^2$ at −20° C. measured as described below under "Determination methods", or a cable comprising a conductor surrounded by at least an inner semiconductive layer, an insulation layer and an outer semiconductive layer, in that order, wherein at least the inner semiconductive layer or the outer semiconductive layer, comprises, preferably consists of, the polymer composition which comprises
  (a) a propylene polymer,
  (b) a polar copolymer,
  (c) a solid conductive filler and, optionally,
  (d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);
  and wherein the polymer composition has a Charpy Notch Impact Strength of at least 10 kJ/m$^2$ at −20° C. measured as described below under "Determination methods"

Accordingly, also the use of the polar copolymer (b) for improving impact strength at low temperatures, preferably impact strength expressed as Charpy Notch Impact Strength and measured at −20° C. as described below under "Determination methods" is provided.

Polymer Composition of the Invention

Preferably, the polymer composition of the invention (referred herein also shortly as polymer composition) can be crosslinked or not. The crosslinked polymer composition has a typical network, i.a. interpolymer crosslinks (bridges), as well known in the field. Preferably, the polymer composition is thermoplastic, i.e. "non-crosslinked". It is noted herein that, as well known, the optional functionalised polyolefin (d), if present, may form crosslinks amongst the component(s) of the polymer composition. Accordingly, "Non-crosslinked" means herein that crosslinking may occur as a result of reactions between the components (a) to (c) and optional (d), but the polymer composition does not comprise any crosslinking agent added as a further component, or is not irradiated, for the purpose to crosslink the composition.

Accordingly, the polymer composition present in the final article, e.g. present in a layer of a final cable, in the end use of the article, preferably the cable, is preferably not crosslinked by any crosslinking agent added as a further component(s), or crosslinked by irradiation step, and is thus called thermoplastic.

The polymer composition has preferably a Charpy Notch Impact Strength of at least 15 kJ/m$^2$ at −20° C., preferably 18 kJ/m$^2$ or more, more preferably 20 kJ/m$^2$ or more at −20° C. measured as described under "Determination methods".

The polymer composition preferably comprises 40 to 99.5 wt %, more preferably 50 to 90 wt %, even more preferably 60 to 80 wt % of the a propylene polymer (a), based on the combined weight (100 wt %) of the propylene polymer (a), the polar copolymer (b) and the optional functionalised polyolefin (d) present in the polymer composition.

The polymer composition comprises the polar copolymer (b) preferably in an amount of from 1.0 to 65 wt %, preferably from 5 to 55 wt %, more preferably from 10 to 50 wt %, more preferably from 15 to 45 wt %, more preferably from 20 to 45 wt %, more preferably from 25 to 40 wt %, more preferably from 25 to 35 wt %, based on the combined weight (100 wt %) of the propylene polymer (a), the polar copolymer (b) and the optional functionalised polyolefin (d) present in the polymer composition.

If present, the polymer composition preferably comprises 0.1 to 5.0 wt %, more preferably 0.6 to 4.0 wt %, even more preferably 0.9 to 3.0 wt %, of the optional functionalised polyolefin (d), based on the combined weight (100 wt %) of the propylene polymer (a), the polar copolymer (b) and the optional functionalised polyolefin (d) present in the polymer composition.

The combined amount of the propylene polymer (a), the polar copolymer (b) and the optional functionalised polyolefin (d) present in the polymer composition is preferably of at least 50 wt %, preferably from 60 to 80 wt %, more preferably of from 65 to 75 wt %, based on the total amount (100 wt %) of the polymer composition.

The polymer composition preferably comprises the propylene polymer (a) of from 30 to 80 wt %, preferably of from 40 to 75 wt %, preferably of from 45 to 75 wt %, based on the total amount (100 wt %) of the polymer composition.

The polymer composition preferably comprises the polar copolymer (b) of from 1.0 to 50 wt %, preferably of from 10 to 40 wt %, preferably of from 15 to 35 wt %, more preferably of from 15 to 30 wt %, based on the total amount (100 wt %) of the polymer composition.

If present, then the polymer composition preferably comprises the optional functionalised polyolefin (d) of up to 10.0 wt %, preferably 0.05 to 5.0 wt %, preferably from 0.1 to 4.0 wt %, preferably of from 0.5 to 3.5 wt %, preferably of from 0.6 to 2.0 wt %, more preferably from 0.7 to 1.5 wt %, based on the total amount (100 wt %) of the polymer composition.

The polymer composition preferably comprises the solid conductive filler (c) in an amount of up to 50 wt %, preferably from 5 to 45 wt %, more preferably of from 10 to 45 wt %, more preferably of from 25 to 35 wt %, based on the total amount (100 wt %) of the polymer composition. The amount of solid conductive filler (c) depends on the nature of the filler and the desired resistivity, as evident for a skilled person.

In the preferred embodiment of the invention the polymer composition comprises one or more the optional functionalised polyolefin (d), preferably one optional functionalised polyolefin (d).

Unexpectedly, in the presence of the optional functionalised polyolefin (d) the volume resistivity (VR) of the polymer composition is less affected during the ageing at elevated temperatures compared to a same composition, but without such functionalised polyolefin (d). Preferably, the presence of the optional functionalised polyolefin (d) has an effect of minimising or even preventing the increase of the volume resistivity of the polymer composition during the storing (i.e. ageing) thereof or the operation of the cable at elevated temperatures, when measured with the determination method as described below under "Determination methods" compared to a same composition, but without such functionalised polyolefin (d). Also unexpectedly the optional functionalised polyolefin (d) has preferably insignificant effect, if effect at all, on the melt flow rate (at 230° C. and load 5.0 kg, $MFR_5$) of the polymer composition, compared to a same composition but without such functionalised polyolefin (d), while the presence of the optional functionalised polyolefin (d) prevents the above discussed VR increase of the polymer composition.

Preferably, the polymer composition has an MFR (230° C., 5.0 kg) from 0.01 to 30.0 g/10 min, preferably from 0.05 to 20.0 g/10 min, preferably from 0.1 to 10.0 g/10 min, more preferably from 1.0 to 8.0 g/10 min. The MFR is determined from a polymer composition which is cooled to and kept at 20-22° C. after the production thereof, preferably in the form of pellets.

Additionally, the polymer composition may comprise further components, such as additives and/or further polymer components, e.g. additives and/or further polymer components conventionally used in the desired end application.

As to further polymer components, preferably the polymer composition comprises no further polymer components in addition to the polyolefin (a), the polar copolymer (b), and the optional functionalised polyolefin (d), if present. Accordingly, the preferred polymer composition consists of the polyolefin (a), the polar copolymer (b) and the optional second polymer (d), if present, as the only polymer components. However, it is to be understood herein that the polymer composition may comprise further component(s), such as additive(s), which may optionally be added in a mixture with a carrier polymer, e.g. in so called master batch. Also the solid conductive filler (c) can be added in form of a master batch. In such cases the carrier polymer is not calculated to the amount of the polymer components. The amount of additives and the carrier polymer of any master batch is calculated to the total amount (100% wt) of the polymer composition.

As additives, such as any of antioxidant(s), scorch retarder(s) (SR), stabiliser(s), processing aid(s), flame retardant additive(s), water tree retardant additive(s), acid or ion scavenger(s) and inorganic filler(s) as known in the polymer field.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned. Specific examples are TMQ, i.e. 2,2,4-trimethyl-1,2-dihydroquinoline (CAS No. 26780-96-1) and Naugard 445™ i.e. 4,4'-bis(1,1'-dimethylbenzyl)diphenylamine (CAS No. 10081-67-1); preferably at least TMQ is used. The amount of an antioxidant is preferably from 0.005 to 2.5 wt % based on the total amount (100 wt %) of the polymer composition. The antioxidant(s) are preferably added in an amount of 0.005 to 2.0 wt %, more preferably 0.01 to 1.5 wt %, even more preferably 0.04 to 0.8 wt %, based on the total amount (100 wt %) of the polymer composition.

The following preferable embodiments, properties and subgroups of the propylene polymer (a), the polar copolymer (b), the solid conductive filler (c) and the optional functionalised polyolefin (d) suitable for the polymer composition are independently generalisable so that they can be used in any order or combination to further define the preferable embodiments of the polymer composition and the article, preferably the cable, produced using the polymer composition.

Where herein it is referred to a polymer or a polyolefin, then it is intended to mean both a homo- and copolymer of a polymer or of a polyolefin. E.g. propylene polymer or polypropylene or, respectively, ethylene polymer or polyethylene, means a propylene homo- and copolymer or, respectively, an ethylene homo- and copolymer. The polyolefin copolymer may contain one or more comonomer(s). As well known "comonomer" refers to copolymerisable comonomer units.

Propylene Polymer (a)

The propylene polymer (a) can be any commercially available polypropylene suitable for the present invention or can be prepared according to or analogously to known polymerization processes described in the chemical literature. The propylene polymer (a) forms the base polymer of the polymer composition.

The preferred propylene polymer (a) is a polypropylene selected from a homopolymer of propylene or a copolymer of propylene with one or more comonomer(s), preferably with ethylene or higher alpha-olefins, or any mixtures thereof. The copolymer of propylene with one or more comonomer(s), preferably with one or more of ethylene or higher alpha-olefin comonomer(s), can be a random copolymer of propylene or a heterophasic copolymer of propylene, which have a well known meaning. The heterophasic copolymer of propylene suitable as the propylene polymer (a) can have a propylene homopolymer or a propylene random copolymer matrix component (1), wherein another propylene copolymer component (2) is dispersed. The propylene copolymer (2) has typically a lower structural order (also known as block copolymer of propylene or a rubber part) than the matrix polymer.

In the random copolymer of propylene the comonomer(s) are distributed randomly to the backbone of the propylene polymer chain.

According to a preferred embodiment of the propylene polymer (a), the propylene polymer is a heterophasic polymer composition comprising a propylene homopolymer matrix (1) or random co-polymer matrix (2) and dispersed therein a propylene copolymer (2) with one or more ethylene or higher alpha-olefin comonomer(s).

Accordingly, there are essentially two kinds of heterophasic propylene copolymers known in the art, namely heterophasic copolymers comprising a propylene random copolymer as matrix phase (RAHECO) or heterophasic copolymers having a propylene homopolymer as matrix phase (HECO). Again, also in case of heterophasic copolymers of propylene, a random copolymer matrix (1) is a copolymer where the comonomer part is randomly distributed in the polymer chains, i.e. consists of alternating sequences of two monomeric units of random length (including single molecules).

Preferably, the propylene copolymer (2) dispersed in the propylene homopolymer or copolymer matrix (1) of the heterophasic propylene copolymer as the propylene polymer (a) is substantially amorphous. The term "substantially amorphous" means herein that the propylene copolymer (2) is less crystalline than the homopolymer or copolymer matrix (1), preferably that the propylene copolymer has a residual crystallinity below a level corresponding to a melting enthalpy of 10 J/g measured according to DSC-ISO 3146.

More preferably, the propylene copolymer (2) dispersed in the propylene homopolymer or copolymer matrix (1) of the heterophasic propylene copolymer as the propylene polyolefin (a) has a weight average particle size of at least less than 1 µm; preferably of 0.9 µm or less, more preferably of 0.8 µm or less. This preferable weight average particle size of less than 1 µm allows a good particle distribution of the dispersed propylene copolymer component to the matrix component and contributes to the impact strength of the polymer composition. Moreover, a low weight average particle size decreases the risk of crazes being initiated by these particles while improving the possibility of said particles to stop already formed crazes or cracks. The weight average particle size distribution of said dispersed propylene copolymer in said polypropylene matrix can be determined by suitable microscopic methods. Examples for such methods are atomic force microscopy (AFM), scanning electron microscopy (SEM) and transmission electron microscopy (TEM). Etching and/or staining of the specimens is normally required to achieve the necessary resolution and clarity of images. Examples for the determination of the particle size distribution and the calculation of the weight average particle size there from can be found in the literature. A suitable method involving SEM on specimens stained with $RuO_4$ is described in Pölt et al. J. Appl. Polym. Sci. 78 (2000) 1152-61.

The preferred heterophasic polypropylene as the preferred propylene polymer (a) is a random heterophasic propylene copolymer (RAHECO). It is preferred that the random propylene copolymer matrix component of the random heterophasic polypropylene as defined above comprises at least one comonomer selected from the group consisting of ethylene and $C_4$-$C_8$ alpha-olefins. Preferred $C_4$-$C_8$ alpha-olefins are 1-butene, 1-pentene, 4-methyl-1-pentene, 1-hexene, 1-heptene or 1-octene, more preferred 1-butene. The most preferred random propylene copolymer consists of propylene and ethylene. Furthermore, the comonomer content of the polypropylene matrix preferably is 0.5 to 30 wt %, more preferably 1 to 20 wt % and most preferably 2 to 7 wt %.

Preferably said polypropylene matrix (1) of the heterophasic polypropylene as the propylene polymer (a) has a melting enthalpy of 25 to 70 J/g at a temperature range of 130° C. to 170° C. measured according to DSC-ISO 3146.

Preferably the polypropylene polymer as the propylene polymer (a) of the polymer composition has an MFR (230° C., 2.16 kg) from 0.05 to 20.0 g/10 min, preferably from 0.05 to 10.0 g/10 min, preferably from 0.1 to 10.0 g/10 min, more preferably from 0.1 to 7.0 g/10 min, more preferably from 0.1 to 5.0 g/10 min, more preferably from 0.2 to 2.0 g/10 min.

The preferred propylene polymer (a) has a melting temperature, Tm, of at least 100° C., preferably from 110 to 180° C., preferably from 120 to 170° C., more preferably from 130 to 160° C., more preferably from 135 to 150° C. The polymer composition comprising propylene polymer (a) with high Tm has an advantage of having desirable impact strength and flexibility properties both at low and high temperatures and, additionally, an advantage of withstanding higher operating temperatures e.g. up to 90° C., when using a base polymer with high Tm.

Examples of suitable polypropylenes are described in e.g. WO03/0026522.

Polar Copolymer (b)

Herein, the polar copolymer (b) is preferably a copolymer, wherein a monomer is copolymerised with at least one type of comonomer bearing a polar group(s) (referred herein also shortly as polar comonomer) and optionally with one or more other comonomer(s), or a polymer wherein a compound bearing polar group(s) is incorporated by grafting.

Polar comonomer bearing a polar group(s) or the compound bearing a polar group(s) is preferably selected from a comonomer containing hydroxyl group(s), alkoxy group(s), carbonyl group(s), carboxyl group(s), ether group(s) or ester group(s), or a mixture thereof, more preferably from a comonomer(s) containing carboxyl and/or ester group(s), still more preferably, the polar comonomer(s) is selected from the group of acrylate(s), methacrylate(s) or acetate(s), or any mixtures thereof. Suitable optional other comonomer(s) for the polar copolymer (b) are selected from olefins, preferably alpha-olefins, or any mixtures thereof.

Preferred polar copolymer (b) is a polar copolymer of olefin, preferably of propylene or ethylene, copolymerised with a polar comonomer bearing a polar group(s) or grafted with a compound bearing a polar group(s). Both polyolefin types are well known in the field.

More preferably the polar copolymer (b) is a polyethylene bearing polar groups, preferably selected from a polyethylene bearing polar groups produced in a low pressure process using a coordination catalyst or a polyethylene bearing polar groups produced in a high pressure (HP) polymerisation process. Both meanings are well known in the field.

The preferred polar copolymer (b) is a copolymer of ethylene with at least one polar comonomer.

The $MFR_2$ (190° C., 2.16 kg) of the copolymer of ethylene is preferably of from 0.05 to 20.0 g/10 min, preferably from 0.1 to 10 g/10 min, preferably from 0.5 to 8.0 g/10 min, more preferably from 0.8 to 7.0 g/10 min, in some embodiments even from 0.8 to 5.0 g/10 min, depending on the desired end application.

In case the propylene polymer (a) is a polyethylene produced in a low pressure process using a coordination catalyst, then it is preferably grafted with a compound bearing polar groups and optionally with one or more comonomers, preferably alpha-olefin(s). Such polyethylene comprising polar groups have preferably a density of from 850 to 950 kg/m³, preferably from 900 to 945 kg/m³, preferably from 910 to 940 kg/m³. Such polyethylene copolymer is preferably a linear low density polyethylene copolymers (LLDPE) and preferably has a density from 915 to 930 kg/m³. Preferable LLDPE bearing polar groups as polar copolymer (b).

Preferably the polar copolymer (b) is a copolymer of ethylene with a polar comonomer(s) and optionally with other comonomer(s), such as alpha-olefin(s). The preferred copolymer of ethylene with a polar comonomer(s) as the polar copolymer (b) is preferably produced in a HP process, preferably by radical polymerisation in the presence of an initiator(s). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

The polyethylene produced in a HP process as the preferred polar copolymer (b) is preferably a low density copolymer of polyethylene with a polar comonomer (referred herein also shortly as a polar LDPE copolymer) which has a density of from 900 to 950 kg/m$^3$, preferably from 910 to 940 kg/m$^3$, preferably from 915 to 930 kg/m$^3$. More preferably, the polar LDPE copolymer as the preferred polar copolymer (b) is selected from a LDPE copolymer of ethylene with polar comonomer(s) and optionally with one or more comonomers. The polar comonomer is preferably selected from a comonomer containing hydroxyl group(s), alkoxy group(s), carbonyl group(s), carboxyl group(s), ether group(s) or ester group(s), or a mixture thereof, more preferably from a comonomer(s) containing carboxyl and/or ester group(s), still more preferably, the polar comonomer(s) is selected from the group of acrylate(s), methacrylate(s) or acetate(s), or any mixtures thereof. Suitable optional other comonomers for LDPE copolymer are selected from olefins, preferably alpha-olefins, or any mixtures thereof.

The polar comonomer(s) for the polar LDPE copolymer as the preferred polar copolymer (b) is more preferably selected from the group of alkyl acrylates, alkyl methacrylates, acrylic acids, methacrylic acids or vinyl acetate, or a mixture thereof. It is further preferred that the polar comonomers are selected from $C_1$- to $C_6$-alkyl acrylates, $C_1$- to $C_6$-alkyl methacrylates, acrylic acids, methacrylic acids and vinyl acetate, more preferred from $C_1$ to $C_4$-alkyl acrylate such as methyl, ethyl, propyl or butyl acrylate, or vinyl acetate, or any mixture thereof. The amount of the polar comonomer in the polar LDPE copolymer is preferably from 5 to 50 wt % based on the total amount of the composition, more preferred up to 30 wt %, most preferred up to 25 wt %. The polar LDPE copolymer as the polar copolymer (b) is preferably selected from ethylene methyl acrylate (EMA), ethylene ethyl acrylate (EEA), ethylene butyl acrylate (EBA) or ethyl vinyl acrylate (EVA). Most preferred polar copolymer (b) is ethylene butyl acrylate (EBA).

The polar LDPE copolymer as the preferred polar copolymer (b) has preferably a melting temperature (Tm) of less than the Tm of the propylene polymer (a). The propylene polymer (a) and the polar copolymer (b) are different polymers. The polar copolymer (b) effects as a softener, which meaning is well known in the field. Preferably the Tm of the polar copolymer (b) is at least 10° C., preferably at least 15° C., preferably at least 25° C., lower than the Tm of propylene polymer (a). Preferably the Tm of the optional second polymer (d) is less than 100° C.

Optional Functionalised Polyolefin (d)

The polymer composition may optionally, and preferably, comprise a polyolefin functionalised with a mono- or polycarboxylic acid compound or a derivative of a mono- or polycarboxylic acid compound (d).

"Functionalised with a mono- or polycarboxylic acid compound or a derivative of a mono- or polycarboxylic acid compound" or shortly "functionalised" means herein generally that the polymer is functionalised with carbonyl containing groups originating from said mono- or polycarboxylic acid group or a derivative thereof. The carbonyl containing compound used for the functionalisation is typically unsaturated. Such compound contains preferably at least one ethylenic unsaturation and at least one carbonyl group. Such carbonyl containing groups can be incorporated to a polymer by grafting a compound bearing said carbonyl containing group(s) or by copolymerising a monomer with a comonomer(s) bearing such carbonyl containing group(s).

Herein, the functionalised carbonyl containing compound is other than the polar comonomer(s) present in the polar copolymer (b). Accordingly, the functionalised carbonyl containing compound of the optional functionalised polyolefin (d) is understood herein not to mean a polar comonomer(s), e.g. an acrylate, a methacrylate or an acetate comonomer of the polar copolymer (b). The optional functionalised polyolefin (d) is thus different from the polar copolymer (b).

Moreover, the functionalised carbonyl containing compound of functionalised polyolefin (d) is understood herein not to mean a polar comonomer(s), e.g. an acrylate, a methacrylate or an acetate comonomer, which may additionally be present in the polyolefin polymer which is to be further functionalised with said carbonyl containing compound to form said functionalised polyolefin (d), as later discussed below.

The optional functionalised polyolefin (d) suitable for the present invention are well known and are commercially available or can be produced according to the known processes described in the chemical literature.

Preferable polycarboxylic acid compounds for functionalisation are unsaturated dicarboxylic acids or derivatives thereof. More preferable carbonyl containing compounds for the functionalisation are derivatives of unsaturated mono- or polycarboxylic acid compounds, more preferably derivatives of unsaturated dicarboxylic acids. Preferred carbonyl containing compounds for functionalisation are anhydrides of a mono- or polycarboxylic acid, which are also referred as "acid anhydrides" or "anhydrides". The acid anhydrides can be linear or cyclic.

Preferably the optional functionalised polyolefin (d) is an acid anhydride functionalised polyolefin, more preferably a maleic anhydride (MAH) optional functionalised polyolefin (d). Preferably, the optional functionalised polyolefin (d) is obtainable by grafting maleic anhydride to a polyolefin (also referred herein shortly as MAH grafted polyolefin or MAH-g-polyolefin).

Preferred polyolefin for optional functionalised polyolefin (d) is a polypropylene or polyethylene. Both polyolefin types are well known in the field.

In case the optional functionalised polyolefin (d) is a polyethylene, then it is preferably selected from a polyethylene produced in a low pressure process using a coordination catalyst or a polyethylene produced in a high pressure (HP) polymerisation process. Both meanings are well known in the field.

The MFR (190° C., 2.16 kg) of the functionalised polyethylene is preferably of above 0.05 g/10 min, preferably from 0.1 to 200 g/20 min, preferably from 0.80 to 100 g/10 min, more preferably from 1.0 to 50.0 g/10 min.

In case the optional functionalised polyolefin (d) is a functionalised polyethylene produced in a low pressure process using a coordination catalyst, then it is preferably selected from copolymers of ethylene with one or more comonomer(s), preferably alpha-olefin(s). Such polyethylene copolymers have preferably a density of from 850 to 950 kg/m$^3$, preferably from 900 to 945 kg/m$^3$, preferably from 910 to 940 kg/m$^3$. Such polyethylene copolymer is preferably a linear low density polyethylene copolymers (LLDPE) and preferably has a density from 915 to 930 kg/m$^3$. Preferable functionalized LLDPE as optional functionalised polyolefin (d) is MAH functionalised LLDPE, preferably MAH-g-LLDPE.

In case the optional functionalised polyolefin (d) is a functionalised polyethylene produced in a HP process, then the polyethylene is preferably produced by radical polymerisation in a HP process in the presence of an initiator(s). The preferable HP polymerisation process is as described above under polar copolymer (b).

Such functionalized polyethylene produced in a HP process as said optional functionalised polyolefin (d) is preferably a functionalized low density polyethylene (LDPE) and preferably has a density of from 900 to 950 kg/m$^3$, preferably from 910 to 940 kg/m$^3$, preferably from 915 to 930 kg/m$^3$. More preferably, the functionalised LDPE polymer is selected from a LDPE homopolymer or a LDPE copolymer of ethylene with one or more comonomers (also referred herein as functionalised LDPE copolymer), which bears said carbonyl containing groups. Suitable comonomers for the functionalised LDPE copolymer are selected from olefins, preferably alpha-olefins, or polar comonomers, or any mixtures thereof. As said above such polar comonomers may additionally be present and are differentiated from the carbonyl containing compounds used for the functionalisation. The functionalised LDPE copolymer of ethylene with polar comonomer may optionally comprise other comonomer(s), such as alpha-olefin(s). In case the optional functionalised polyolefin (d) is a functionalised polar LDPE copolymer, then the preferable polar comonomer(s) are as described above under polar copolymer (b). The amount of such polar comonomer in the functionalised LDPE copolymer is preferably from 5 to 50 wt % based on the total amount of the composition, more preferred up to 30 wt %, most preferred up to 25 wt %. Functionalised LDPE homopolymer or LDPE copolymer as said optional functionalised polyolefin (d) is preferably selected from a MAH functionalised LDPE homopolymer, a MAH functionalised LDPE copolymer which is preferably selected from a MAH functionalised ethylene methyl acrylate (EMA), a MAH functionalised ethylene ethyl acrylate (EEA), a MAH functionalised ethylene butyl acrylate (EBA) or MAH functionalised ethyl vinyl acrylate (EVA), more preferably from MAH-g-LDPE homopolymer or MAH-g-LDPE copolymer, more preferably from MAH-g-EMA, MAH-g-EEA, MAH-g-EBA or MAH-g-EVA.

In case the optional functionalised polyolefin (d) is a functionalised polypropylene, then it is preferably selected from homopolymers of propylene, random copolymers of propylene or a heterophasic copolymer of propylene, which have the same meaning and properties as given above under the general description for propylene polymer (a), and which bear said functional groups. The size of a dispersed copolymer (2) in heterophasic copolymer of propylene suitable for the polyolefin of the optional functionalised polyolefin (d) is not limited. Preferred functionalised polypropylene is a functionalised homopolymer or a random copolymer of propylene.

According to a preferred embodiment of the polymer composition, the maleic anhydride functionalised, preferably grafted, polyolefin is maleic anhydride functionalised, preferably grafted, polypropylene (MAH-g-PP) or maleic anhydride functionalised, preferably grafted, polyethylene (MAH-g-PE).

Preferred polyolefin for the optional functionalised polyolefin (d) is a functionalised polypropylene as defined above. Such polypropylene (PP) for the optional functionalised polyolefin (d) is preferably a maleic anhydride functionalised PP, more preferably MAH-g-PP.

Preferably the content of said optional functionalised polyolefin (d), preferably the MAH functionalised PP, more preferably MAH-g-PP, is up to 10 wt %, preferably up to 5.0 wt %, preferably from 0.1 to 4.0 wt %, preferably from 0.5 to 3.5 wt %, preferably from 0.6 to 2.0 wt %, more preferably from 0.7 to 1.5 wt %, based on the total amount (100 wt %) of the polymer composition.

Further preferably the optional functionalised polyolefin (d), preferably the MAH functionalised PP, more preferably MAH-g-PP, has an MFR$_2$ (230° C., 2.16 kg) of from 0.5 to 500 g/10 min, preferably from 1.0 to 500 g/10 min.

It is preferred that the polymer composition comprises the functionalised polyolefin (d).

Solid Conductive Filler (c)

The solid conductive filler (c) suitable for the present invention is not limited and can be selected depending on the end application of said polyolefin composition. The solid conductive filler (c) is preferably any carbon black which is electrically conductive. Preferably the carbon black has one or more of the following properties: i) a primary particle size of at least 5 nm which is defined as the number average particle diameter according to ASTM D3849-95a procedure D, ii) iodine number of at least 30 mg/g according to ASTM D1510, and/or iii) DBP (dibutyl phthalate) absorption number of from 80 to 300 cm$^3$/100 g, preferably less than 180 cm$^3$/100 g, when measured according to ASTM D 2414-06a.

Non-limiting examples of carbon blacks as said conductive filler (c) of the invention are e.g. carbon black grades described with ASTM Nxxx codes, e.g N110 type, Ensaco black, supplied e.g. by Timcal, acetylene black, furnace black and Ketjen black.

Non-limiting examples of carbon blacks include furnace carbon blacks and acetylene blacks. Such carbon blacks are commercially available.

For the most preferred carbon black as the solid conductive filler (c), preferably the particle size is about 29 nm or less, preferably from 15 to 25 nm, the specific surface (BET) is from 100 150 m$^2$/g, preferably about 134 m$^2$/g, and the Iodine number is from 140 to 180 g/kg, preferably about 160 g/kg.

According to a preferred embodiment of the polymer composition, the solid conductive filler (c) is present in an amount of from 10 to 45 wt %.

Preparation of the Polymer Composition

The invention further provides a process for the manufacturing of a composition of the invention, which process comprises a step of mixing together, (a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound wherein said functionalised carbonyl containing compound of the polyolefin (d) is other than the polar comonomer(s) present in the polar copolymer (b);

and wherein the polymer composition has a Charpy Notch Impact Strength of at least 10 kJ/m² at −20° C. at −20° C. measured in accordance with ISO 179-1eA:2000; preferably wherein the process comprises a further step of pelletising the obtained polymer composition.

In the mixing step of the process for the manufacturing of the polymer composition of the invention a propylene polymer (a), polar copolymer (b), a solid conductive filler (c) and, optionally, optional functionalised polyolefin (d) are preferably mixed in a mixer or an extruder.

For mixing a conventional compounding or blending apparatus, e.g. a continuous single or twin screw mixer (extruder) such as Farell™, Werner and Pfleiderer and Buss (preferred), an internal batch mixer, such as Brabender™ and a Banbury™ mixer, a 2-roll rubber mill, a Buss-co-kneader or a twin screw extruder may be used. The mixing is preferably carried out before the polymer composition is provided to the article producer for producing the article. Preferably the polymer composition is mixed in an extruder and pelletised in a known manner to pellets. Pellets can be of any shape or size. The pre-made pellets of the polymer composition are preferably used by the end producer for producing an article.

End Use of the Polymer Composition

The article comprising the polymer composition of the invention is preferably a cable, comprising a conductor surrounded by at least one layer, wherein the layer comprises the polymer composition.

The term "conductor" means herein above and below that the conductor comprises one or more wires. The wire can be for any use and be e.g. optical, telecommunication or electrical wire. Moreover, the cable may comprise one or more such conductors. Preferably the conductor is an electrical conductor and comprises one or more metal wires.

The cable is preferably a power cable. A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables, especially for power cables operating at voltages 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables.

More preferably, the cable is selected from a cable of a first embodiment comprising a conductor surrounded by at least a semiconductive layer comprising, preferably consisting of, the polymer composition which comprises
(a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);
and wherein the polymer composition has a Charpy Notch Impact Strength of at least 10 kJ/m² at −20° C. measured in accordance with ISO 179-1eA:2000, or
a cable of a second embodiment comprising a conductor surrounded by at least an inner semiconductive layer, an insulation layer and an outer semiconductive layer, in that order, wherein at least the inner semiconductive layer or the outer semiconductive layer, comprises, preferably consists of, the polymer composition which comprises
(a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);
and wherein the polymer composition has a Charpy Notch Impact Strength of at least 10 kJ/m² at −20° C. measured in accordance with ISO 179-1eA:2000.

The first embodiment and the second embodiment are equally preferred. In case of the second embodiment preferably at least the inner semiconductive layer, more preferably both the inner and outer semiconductive layer comprises the polymer composition of the invention.

The cable of the invention is preferably for LV, MV or HV power cable applications. Preferable cable is a MV or HV power cable, more preferably a MV power cable. Moreover the outer semiconductive layer can be strippable (peelable) or bonded (not peeled off) which terms have a well known meaning. Preferable outer semiconductive layer is a bonded layer.

As well known the cable can optionally comprise further layers, e.g. layers surrounding the insulation layer or, if present, the outer semiconductive layers, such as screen(s), a jacketing layer(s), other protective layer(s) or any combinations thereof.

The preparation process of the cable of the invention, is also provided, wherein a cable is produced by
(a) providing and mixing, preferably meltmixing in an extruder, the polymer composition of the invention which comprises
(a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);
and wherein the polymer composition has a Charpy Notch Impact Strength of at least 10 kJ/m² at −20° C. measured in accordance with ISO 179-1eA:2000; as defined above or in claims,
(b) applying a meltmix of the polymer composition obtained from step (a), preferably by (co)extrusion, on a conductor to form at least one layer, preferably a semiconductive layer (the first embodiment of the cable).

The preparation process of the invention for producing the power cable of the second embodiment comprising a conductor surrounded by an inner semiconductive layer, an insulation layer, and an outer semiconductive layer, in that order, wherein the process comprises the steps of
(a)
providing and mixing, preferably meltmixing in an extruder, a first semiconductive composition comprising a polymer, a conductive filler and optionally further component(s) for the inner semiconductive layer, providing and mixing, preferably meltmixing in an extruder, a polymer composition for the insulation layer, providing and mixing, preferably meltmixing in an extruder, a second semiconductive composition which is preferably and comprises a polymer, a conductive filler and optionally further component(s) for the outer semiconductive layer, (b)

applying on a conductor, preferably by coextrusion, a meltmix of the first semiconductive composition obtained from step (a) to form the inner semiconductive layer, a meltmix of polymer composition obtained from step (a) to form the insulation layer, and a meltmix of the second semiconductive composition obtained from step (a) to form the outer semiconductive layer, wherein at least one of the first semiconductive composition or the second semiconductive composition, preferably both the first semiconductive composition and the second semiconductive composition, comprises the polymer composition of the invention which comprises (a) a propylene polymer,
(b) a polar copolymer,
(c) a solid conductive filler and, optionally,
(d) a polyolefin functionalised with a mono- or polycarboxylic acid compound or a derivative of a mono- or polycarboxylic acid compound, wherein said functionalised carbonyl containing compound of the polyolefin (d) is other than the polar comonomer(s) present in the polar copolymer (b);

and wherein the polymer composition has a Charpy Notch Impact Strength of at least 10 kJ/m$^2$ at $-20°$ C. measured in accordance with ISO 179-1eA:2000; as defined above or in claims.

Melt mixing means mixing above the melting temperature of at least the major polymer component(s) of the obtained mixture and is typically carried out in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance triple extrusion can be used for forming three cable layers.

Preferable the polymer composition is provided to the (melt)mixing step (a) in form of pre-made pellets as described above.

In a preferred embodiment the polymer composition of the invention is not crosslinked, i.e. is thermoplastic in the final article. Also preferably, the final article, preferably cable, more preferably the power cable, as defined above or in claims, is not crosslinked. In this preferred embodiment the article, preferably the cable, more preferably the power cable, as defined above is non-crosslinked when used in the end application thereof.

It is preferred that one of the layers of the power cable is thermoplastic, i.e. non-crosslinked, more preferably that all of the layers are thermoplastic.

The polymer composition of the invention has advantageous properties which are highly useful for a semiconductive layer of a power cable acrylate copolymers and carbon black have the following properties that are:

High impact strength at low temperature

High flexibility

Large elongation at break

Moreover:

Thermoplastic, i.e. do not require the crosslinking procedure

Good mechanical properties, especially at low temperature

Determination Methods

Wt % means weight by %.

Comonomer Contents a) Comonomer Content in Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of Alpha-olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(203), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Linear Low Density Polyethylene (1) Polymers Containing >6 Wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains $0.20/M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: $M_{butylacrylate}$=128 g/mole, $M_{ethylacrylate}$=100 g/mole, $M_{methylacrylate}$=86 g/mole).

Density: Low density polyethylene (LDPE): The density was measured according to ISO 1183-2. The sample preparation was executed according to ISO 1872-2 Table 3 Q (compression moulding).

Low Process Polyethylene: Density of the polymer was measured according to ISO 1183/1872-2B.

The melt flow rate (MFR): The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg (MFR$_2$) or 21.6 kg (MFR$_{21}$).

In this application the MFR was measured according to ISO 1133 measured at 230° for PP components and 190° for PE, EBA and EMA components. The MFR of the polymer composition was measured according to ISO 1133 measured at 230° with 5.0 kg load (MFR$_S$ at 230°).

The volume resistivity (VR): was measured on strings extruded during the MFR tests using the following procedure: The strings had a diameter D between 1 and 10 mm, preferably around 3 mm, and a length L of 10 to 1000 mm, preferably around 100 mm. The diameter was measured using calipers and the length with a ruler, both recorded in centimeters. The resistance R was measured in ohms using an ohm-meter. The area A was calculated as A=pi*(D/2)^2. The volume resistivity VR was calculated as VR=R*A/L.

Melting Temperature Tm, Crystallization Temperature Tc, Melting enthalpy Hm, Crystallization Enthalpy Hc, Crystallinity Xc of polypropylene (propylene polymer (a)): ISO 11357-3:1999, The melting temperature Tm, crystallisation temperature Tc and degree of crystallinity of propylene polymer (a) are measured for with a Mettler TA820 differential scanning calorimetry device (DSC) on 3±0.5 mg samples. Crystallisation and melting temperatures are obtained during 10° C./min cooling and heating scans between 30° C. and 225° C. Melting and crystallisation temperatures were taken as the peaks of the endotherms and exotherms. It is measured on cut specimens of 0.5 mg. The values for melting point Tm and melting enthalpy Hm are determined in the second heat (PP method −30° C.).

The measurement of the melting temperature $T_m$ of a polymer (polar copolymer (b)) other than polypropylene: carried out by Differential Scanning calorimetry (DSC) according to ISO 11357-6 using a heating and cooling rate of 10° C./min.

$T_m$ was measured with Mettler TA821 using a 5±1 mg sample in a nitrogen atmosphere. First the sample was melted (30° C. to 180° C. with a heating rate of 10° C./min) and then it was held at 180° C. for 5 min. After that the sample was cooled down to −30° C. with a cooling rate of 10° C./min followed by a second melting (−30° C. to 180° C. at a heating rate of 10° C./min). The data reported and used in Table 1 were all taken from the second melting. For the determination of $T_m$ a base line was drawn from 0° C. to the point in the DSC curve where the melting is completed. $T_m$ is defined as the temperature where the heat flow to the sample is at its maximum, e.g. where the distance from the measured DSC curve and the base line is at its maximum.

Tensile properties, i.e. Tensile strain at break (%): According to ISO 527-2, measured on injection moulded dogbone specimens of 3 mm thickness moulded in accordance to EN ISO 1873-2 standard conditions not earlier than 96 hours after moulding. Crosshead speed for testing the modulus was 1 mm/min. Crosshead speed for testing the tensile strength and elongations was 50 mm/min.

Charpy Notched Impact Strength (NIS): NIS was determined according to ISO 179-1eA:2000 on V-notched samples of 80×10×4 mm³ at 23° C. and −20° C. (Charpy notched impact strength (23° C.)). The test specimens were prepared by injection moulding using an IM V 60 TECH machinery in line with EN ISO 1873-2 (80*10×4 mm³), moulded in accordance to standard conditions, and were measured on not earlier than 96 hours after moulding. The melt temperature was 200° C. and the mould temperature was 40° C.

Experimental Part

The following components were used in the inventive examples of the polymer composition of the invention given below:

Propylene (a) 1: Commercially available Borsoft™ SA233CF available from Borealis Polyolefine GmbH (Austria) which is a random-heterophasic polypropylene copolymer produced in a low pressure polymerisation process and comprising a polypropylene-co-ethylene-random copolymer as matrix phase and an ethylene propylene-rubber as dispersed phase, which had an MFR₂ (230° C., 2.16 kg) of 0.8 g/10 min. Tm of 138-142° C.

Propylene (a) 2: Commercially available Borsoft™ SD233CF—a random-heterophasic polypropylene copolymer commercially available from Borealis Polyolefine GmbH (Austria) produced in a low pressure polymerisation process and comprising a polypropylene-co-ethylene-random copolymer as matrix phase and an ethylene propylene-rubber as dispersed phase, which has an MFR₂ (230° C., 2.16 kg) of 7 g/10 min. Tm of 138-142° C.

Polar copolymer (b) 1: A conventional copolymer of ethylene with butyl acrylate produced in a tubular reactor of a high pressure polymerisation process, MFR (190° C., 2.16 kg) of 1.1 g/10 min. Butyl Acrylate (BA) content of 17 wt % and melt temperature Tm of 98° C.

Polar copolymer (b) 2: A conventional copolymer of ethylene with butyl acrylate polymer produced in a tubular reactor of a high pressure polymerisation process, MFR (190° C., 2.16 kg) of 7 g/10 min. Butyl Acrylate (BA) content of 17 wt % and melt temperature Tm of 96° C.

Polar copolymer (b) 3: A conventional copolymer of ethylene with methyl acrylate polymer produced in a tubular reactor of a high pressure polymerisation process, methyl acrylate (MA) content of 20 wt %, MFR 6 g/10 min, Density 938 kg/m³, Cryst. 22 wt %, Melting point, Tm of 92° C., Vicat softening point 54° C.

Optional functionalised polyolefin (d): Exxelor™ PO1020 is a maleic anhydride (MAH) functionalized polypropylene commercially available from Exxon Mobil (USA) having a density 0.9 g/cm³, an MFR₂ (230° C./2.16 kg) of 430 g/10 min and a MAH content of 1.0 mol %.

Reference polymer (b): A conventional homopolymer of produced in a tubular reactor of a high pressure polymerisation process (LDPE) Density 923 kg/m³, MFR₂ 0.75 g/10 min, Melting temperature, Tm, of 112° C., Vicat softening point 97° C.

Solid conductive filler (c): Carbon Black, which is a commercially available Elftex™ 254, from Cabot (in the form of dry pelletized carbon blacks) with the following properties:

Iodine number <160 mg/g
Particle size <25 nm
Ash content <0.1%
Toluene extract <0.03%
Antioxidants
Vulcanox™ HS/LG, TMQ, provider: Lanxess
Irganox™ MD 1024, (2',3-bis[[3-[3,5-di-tert-butyl-4-hydroxyphenyl]propionyl]propionohydrazide); provider: Ciba, now part of BASF
Irganox™ B225 which is a 50/50 mixture of Irgafos™ 168 (tris(2,4-di-tert-butylphenyl)phosphite) and Irganox™ 1010 ([343-(3,5-ditert-butyl-4-hydroxyphenyl)propanoyloxy]-2,2-bis[3-(3,5-ditert-butyl-4-hydroxyphenyl)propanoyloxymethyl]propyl]3-(3,5-ditert-butyl-4-hydroxyphenyl)propanoate); provider: Ciba, now part of BASF Compounding (mixing) of the polymer compositions of the examples: The inventive examples were mixed by compounding (see the amounts of the used components in Table 1) on a Buss MDK 46 kneader (supplier Buss, reciprocating co-kneader with special screw design). Typical temperature zones of the compounder during this compounding step ranged from 140° C. to 200° C., and an extrusion temperature around 160° C. The obtained melt mix product was pelletized and the pellets of each example sample were used for the below determination methods.

TABLE 1

The used components, the amounts of the compositions of the examples and the measured mechanical properties. The amounts are calculated based on the total amount (100 wt %) of the polymer composition

|  | Inv. ex. 1 | Inv. ex. 2 | Inv. ex. 3 | Ref. ex. |
|---|---|---|---|---|
| Propylene (a) 1 | 48 | 48 | 47 | |
| Propylene (a) 2 | | | | 50.5 |
| Polar copolymer (b) 1 | 20 | | | |
| Polar copolymer (b) 2 | | | 20 | |
| Polar copolymer (b) 3 | | 20 | | |
| Ref. polymer (b) | | | | 25 |
| Functionalised polyolefin (d): EXXELOR™ PO 1020 | | | 1 | 1 |
| Solid cond. filler (c) Elftex™ 254 (Carbon black) | 30 | 30 | 30 | 22 |
| AO: TMQ | 2 | 2 | 2 | 1 |
| AO: Irganox™ MD 1024 | | | | 0.25 |
| AO: Irganox™ B225 | | | | 0.25 |
| Exp. results | | | | |
| Tensile strain at break (%) | 313.84 | 285.07 | 58.54 | 25.57 |
| NIS (23° C.) kJ/m$^2$ | 81.8 | 73 | 60.2 | 56 |
| NIS (−20° C.) kJ/m$^2$ | 60.8 | 22.8 | 36.2 | 5.9 |
| Tm (° C.) | 100 | 100 | 104 | 103 |
| VR (ohm cm) | 9.9 | 12.5 | — | 6.7 |

The Table 1 and FIG. 1 show the notched impact strength (NIS), elongation at break and tensile modulus. The figure shows that the inventive polymer compositions with polar copolymer component (b) provide highly advantageous and clearly better impact strength properties, also at low temperature, compared to the reference polymer composition with non-polar component (LDPE). The table also shows that the volume resistivity is very good for all the compositions.

The inventive polymer compositions of Inv.Ex 1-3 show also markedly better tensile strength at break property compared to the polymer composition of the Ref.ex.

The Table 1 also show that the flexibility is positively affected by the polar copolymer.

The Table 1 show the DSC-results revealing that all compositions have a melting temperature in excess of 99° C., i.e. well above the standard operation temperature of medium voltage (MV) cables that is 90° C.

The invention claimed is:

1. A composition for a semiconductive layer of a cable, comprising
   (a) a heterophasic copolymer of propylene,
   (b) a polar copolymer comprising ethylene and at least one polar comonomer bearing a polar group, the polar comonomer being selected from $C_1$- to $C_6$-alkyl acrylates, $C_1$- to $C_6$-alkyl methacrylates, acrylic acids, methacrylic acids and vinyl acetate, wherein the polar copolymer has a density of from 900 kg/m$^3$ to 945 kg/m$^3$,
   (c) a solid conductive filler, and
   (d) a polyolefin functionalised with a mono- or polycarboxylic acid compound or a derivative of a mono- or polycarboxylic acid compound, wherein said functionalised polyolefin has a melt flow rate (230° C., 2.16 kg) of from 0.5 to 500 g/10 min and further wherein said mono- or polycarboxylic acid compound or a derivative of a mono- or polycarboxylic acid compound is not the polar comonomer present in the polar copolymer (b); and wherein the composition has a Charpy Notch Impact Strength of at least 10 kJ/m$^2$ at −20° C., measured in accordance with ISO 179-1eA:2000,
   wherein said composition is not crosslinked by the addition of a crosslinking agent.

2. A composition according to claim 1 wherein the solid conductive filler is a carbon black.

3. A composition according to claim 1 wherein the heterophasic copolymer of propylene comprises a polypropylene homopolymer or random copolymer matrix and dispersed therein a second propylene copolymer.

4. A composition according to claim 3 wherein the second propylene copolymer dispersed in the matrix has a weight average particle size of less than 1 μm.

5. A composition according to claim 1 wherein the composition has a melt flow rate (230° C., 5.0 kg) from 0.01 to 30.0 g/10 min.

6. A composition according to claim 1, wherein the polar groups of the polar copolymer (b) are incorporated by copolymerising an ethylene monomer with at least one polar comonomer or by grafting a polar group bearing compound to a polymer.

7. A composition according to claim 1 wherein the polar copolymer (b) is characterized by a melt flow rate (190° C., 2.16 kg) of from 0.05 to 20.0 g/10 min.

8. A composition according to claim 1, wherein the heterophasic copolymer of propylene has a melt flow rate (230° C., 2.16 kg) of from 0.05 to 20.0 g/10 min.

9. A composition according to claim 1 wherein the mono- or polycarboxylic acid compound or a derivative of a mono- or polycarboxylic acid compound of the functionalised polyolefin (d) is a linear or cyclic anhydride of a mono- or polycarboxylic acid.

10. A composition according to claim 1, wherein the composition has a Charpy Notch Impact Strength of at least 15 kJ/m$^2$ at −20° C. when measured in accordance with ISO 179-1eA:2000.

11. A composition according to claim 1, wherein the composition comprises the heterophasic copolymer of propylene of from 40 to 99.5 wt % based on the combined weight (100 wt %) of the heterophasic copolymer of propylene, the polar copolymer (b) and the functionalised polyolefin (d) present in the composition.

12. A composition according to claim 1, wherein the composition comprises the polar copolymer (b) in an amount of from 1.0 to 65 wt % based on the combined weight (100 wt %) of the heterophasic copolymer of propylene, the polar copolymer (b) and the functionalised polyolefin (d) present in the composition.

13. A composition according to claim 1, wherein the composition comprises the solid conductive filler (c) in an amount of up to 50 wt % based on the total amount (100 wt %) of the composition.

14. A composition according to claim 1, wherein the composition comprises the functionalised polyolefin (d) in an amount of up to 10.0 wt % based on the total amount (100 wt %) of the composition.

15. A composition according to claim 1, wherein the polar copolymer is ethylene methyl acrylate (EMA), ethylene ethyl acrylate (EEA), ethylene butyl acrylate (EBA) or ethylene vinyl acetate.

16. A composition according to claim 1, wherein polyolefin (d) is maleic anhydride (MAH) grafted polypropylene.

17. A composition for a semi conductive layer of a cable, comprising
  (a) a heterophasic copolymer consisting of a propylene homopolymer or random propylene ethylene copolymer matrix and a propylene copolymer with ethylene, wherein the heterophasic copolymer has a melt flow rate (230° C., 2.16 kg) of from 0.05 to 20.0 g/10 min,
  (b) a polar copolymer comprising ethylene and at least one polar comonomer bearing a polar group, the polar comonomer being selected from $C_1$- to $C_6$-alkyl acrylates, $C_1$- to $C_6$-alkyl methacrylates, acrylic acids, methacrylic acids and vinyl acetate, wherein the polar copolymer has a density of from 900 kg/m$^3$ to 945 kg/m$^3$,
  (c) a solid conductive filler and, optionally,
  (d) a polyolefin functionalised with a mono- or polycarboxylic acid compound or a derivative of a mono- or polycarboxylic acid compound, wherein said mono- or polycarboxylic acid compound or a derivative of a mono- or polycarboxylic acid compound is other than the polar comonomer(s) present in the polar copolymer (b);
  and wherein the composition has a Charpy Notch Impact Strength of at least 10 kJ/m$^2$ at −20° C., measured in accordance with ISO 179-1eA:2000.

18. A cable comprising the composition according to claim 1, wherein (1) the cable comprises a conductor surrounded by at least a semiconductive layer comprising the composition of claim 1 or (2) the cable comprises a conductor surrounded by in the following order at least an inner semiconductive layer, an insulation layer and an outer semiconductive layer, wherein at least the inner semiconductive layer, the outer semiconductive layer, or both comprises the composition of claim 1.

19. A composition according to claim 1, wherein the polar copolymer is produced by high pressure polymerization of ethylene and at least one polar comonomer.

20. A composition according to claim 19, wherein the high pressure polymerization is conducted at a pressure of from 70 MPa to 400 MPa and a temperature of from 80° C. to 400° C.

* * * * *